July 15, 1947.  A. S. HOFFMAN  2,424,169
SELF-ILLUMINATED PLASTIC PLUG-IN ALPHABET BLOCKS
Filed May 22, 1945  2 Sheets-Sheet 1
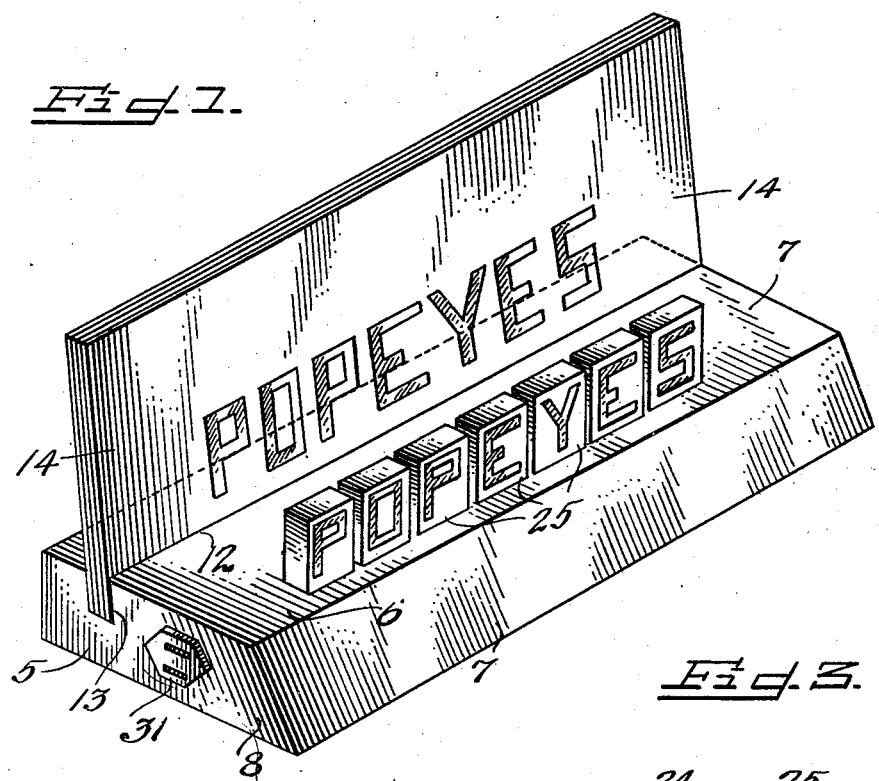
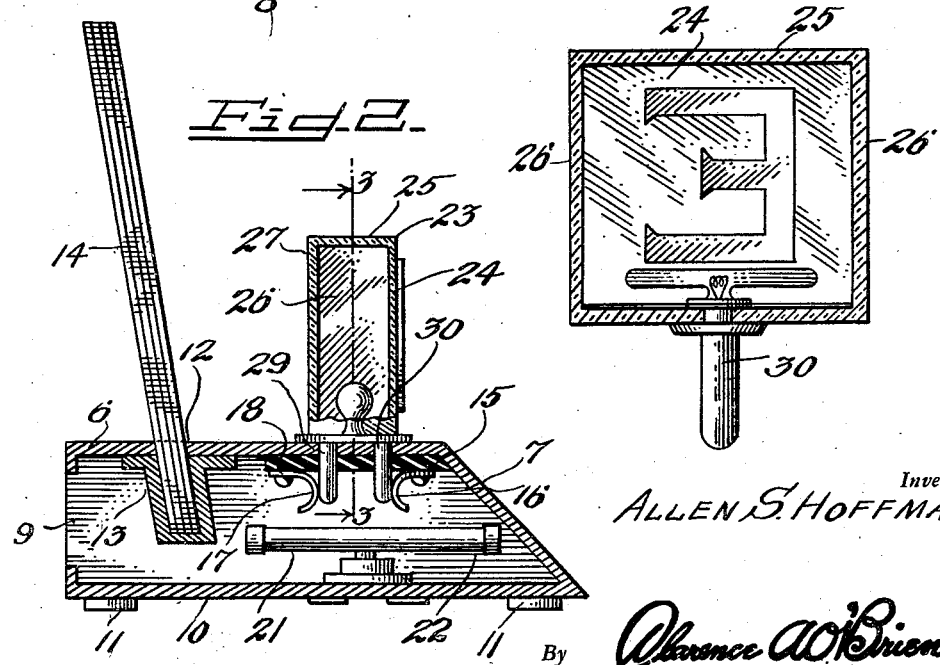
Inventor
ALLEN S. HOFFMAN
By Clarence A. O'Brien
and Harvey B. Jacobson
Attorneys July 15, 1947.  A. S. HOFFMAN  2,424,169
SELF-ILLUMINATED PLASTIC PLUG-IN ALPHABET BLOCKS
Filed May 22, 1945   2 Sheets-Sheet 2
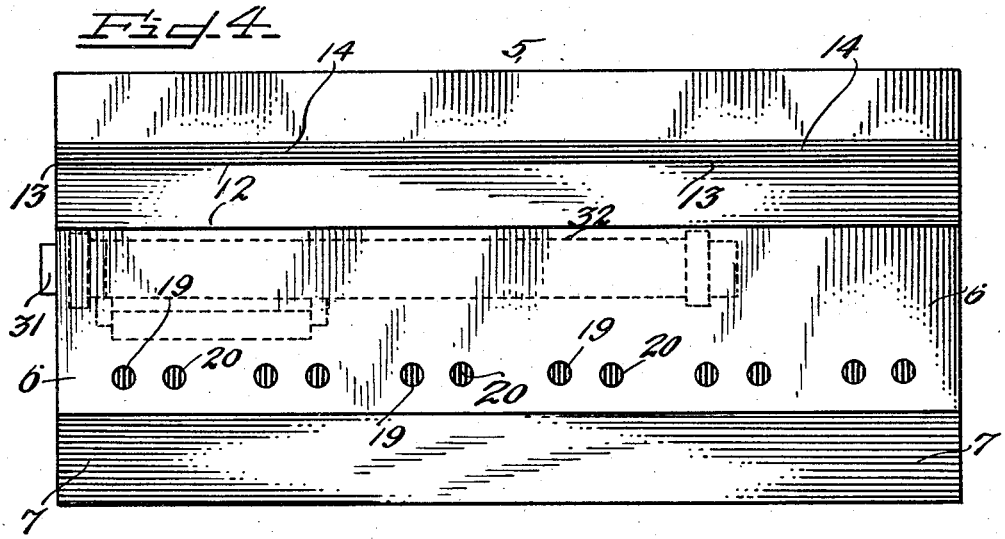
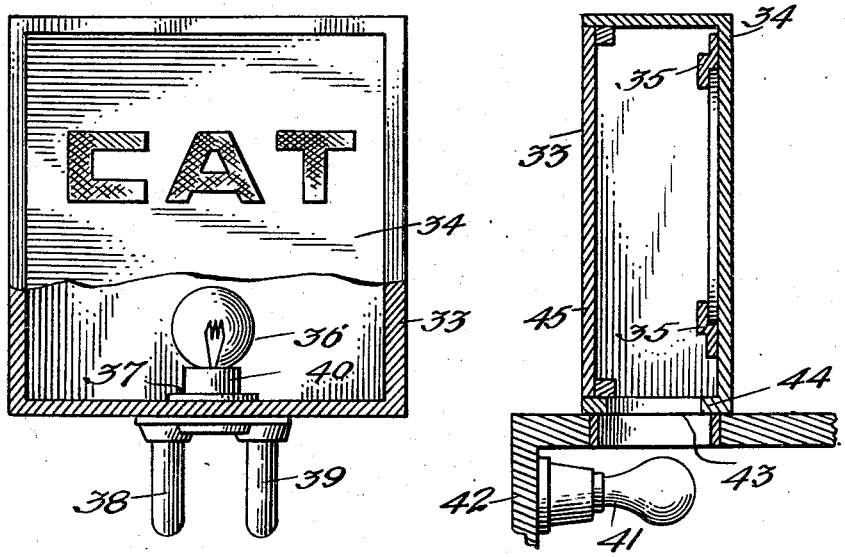
INVENTOR.
ALLEN S. HOFFMAN Patented July 15, 1947

2,424,169

UNITED STATES PATENT OFFICE 2,424,169

SELF-ILLUMINATED PLASTIC PLUG-IN ALPHABET BLOCKS

Allen S. Hoffman, Council Bluffs, Iowa, assignor to Howard Sales Company, Council Bluffs, Iowa, a copartnership Application May 22, 1945, Serial No. 595,204

4 Claims. (Cl. 35—35)

This invention relates to a set of alphabet blocks, preferably constructed of plastic material, and provided with plug-in pins or prongs arranged to engage sockets forming in a base having illuminating means therein, and to an example board on which a word is printed or displayed, the whole being so arranged that an example is presented to a child of a given letter form or group which composes a complete word, and the child is supplied with loose alphabet blocks, from which he or she is to select the matching blocks and then arrange them in their correct word relation, by inserting the plug-in pins or prongs in the sockets of the base provided for this purpose.

Another object of the invention is to provide alphabet blocks for this purpose which are self illuminating.

A further object of the invention is to provide a transparent plastic alphabetic block with means enclosed by the body of the block for illuminating a letter printed, attached to or formed on the face of the block, which will be adapted when used in multiples or letter grouping arrangements, to present names, messages, or when provided with ordinals instead of letters, to represent home or building numbers.

With the above and other objects in view the invention relates to certain new and useful constructions, combinations and arrangements of parts, clearly described in the following specification, and fully illustrated in the accompanying drawings, in which:

Fig. 1 is a view in perspective, showing a combined base and alphabet block group arranged in letter form and a display card supported in a groove of the base and displaying the example word form.

Fig. 2 is a vertical sectional view through the combined base, block letter, and the display card, showing one means for illuminating the interior of the base.

Fig. 3 is a detail vertical sectional view of one of the letter blocks, enlarged, showing the means for illuminating the same.

Fig. 4 is a plan view of the base, with the letter blocks removed, to expose the plug-in sockets of the base, and illustrate another form of interior illumination.

Fig. 5 is a detail view, partly in elevation and partly in vertical section, of another form of the plug-in letter or alphabet block, but showing a complete word, and a modified form of illumination therefor.

Fig. 6 is a central vertical sectional view, through a modified form of letter block.

Referring to the accompanying drawings, which illustrate the practical embodiment of my invention, 5 designates a base, which is preferably constructed of transparent plastic or other material, or translucent plastic or other material having the quality of allowing non-glaring light rays to pass through the same. This base includes the top wall 6, and a sloping front 7, and walls 8, and an open rear 9. The bottom wall 10 is supported by suitable slide caster devices 11.

The top wall is formed with a slot 12 and a pocket 13 to receive the lower longitudinal edge portions of a series of display cards 14, is arranged in line with the slot 12. The slot 12 and the pocket 13 thus provide a longitudinal groove for the base, and the pocket 13 is disposed in diagonal relation to the horizontal plane of the top wall to tilt the display or example cards 14.

The top wall is reinforced by a longitudinal strip 15, cemented or otherwise secured against the inner face of the top wall, so as to have full contact therewith. This strip is equipped with curved spring members 16 and 17, attached by rivets 18 thereto. Socket holes 19 and 20 are formed in the top wall and through the strip 15 in pairs of equally spaced holes, which are disposed vertically in the top wall and the underlying strip 15.

A tube lamp 21 is arranged in the chamber space 22 of the base 5, to illuminate the top wall and the sloping front wall. The spring contact members 16 and 17 may be suitably wired with a current source.

The individual blocks 23 are shown to be hollow, but may be constructed solid, of transparent, or translucent material, preferably of plastic material. Each block is shown to include the display or face wall 24, the top wall 25, side walls 26, a back wall 27, and a base 28, which carrier the prongs or pins 29 and 30, which are insertable in any pair of the socket holes 19 and 20 formed in the top wall of the base.

All of the spring contact members are wired to the end plug-in receptacle 31, secured to the base.

The display cards are preferably arranged in a group, each individual card of which is provided with a separate word example display. These cards are supported in their receiving socket or groove so that they will be inclined upwardly and rearwardly, thus presenting the subject matter of the foremost card at the most suitable reading angle to the child using the set.

The base may be illuminated by a tube lamp 32, shown in dotted lines in Fig. 4, of the fluorescent type or any other type, which is shown to be disposed in parallel relation to the length of the base. Obviously, the letters on the faces of the blocks can be applied with a fluorescent substance which will respond to the type of radiations emanating from the lamp and hence, many novel types of display may be produced.

In Figs. 5 and 6 I show modified forms of the block structure, which includes a hollow body 33, which is provided with a display front 34, and a card holder 35 attached to the rear side of this display front. A series of thin flat cards may be arranged in this card holder, so that the outermost card will lie flush against the inner face of the display front, which is transparent or translucent. The cards may be printed with individual letters, or with complete words.

In Fig. 5 an electrical lamp 36 is shown to be mounted on the base 37, and this base is provided with the plug-in pins or prongs 38 and 39, which have suitable electrical conductive connections with the socket 40 of the lamp 36. In Fig. 6 a lamp 41 is shown to be supported by the vertical wall or strip 42 in a horizontal position, so that the bulb of the lamp will lie directly under the light opening 43 formed in the base 44 of the block 45.

It is apparent that the individual letter or alphabet blocks arranged in any word combination, may be used for educational purposes with children, as illustrated in Fig. 1, or employed to convey information or messages, and may be combined with the complete word blocks for this purpose. Where employed for the latter purpose the base 5 is made somewhat narrower than the slot 12 and pocket 13 for holding the cards may be dispensed with.

It is understood that various changes in the details of construction, their arrangement and combination, may be made, within the limits of the claims hereof.

Having described my invention I claim as new:

1. An educational device comprising a transparent plastic base having a longitudinal row of openings in its upper face near its forward edge, said openings being arranged in longitudinally spaced pairs, said base also having a longitudinal groove in its upper face lying parallel with the row of openings near the rear edge of the base, a group of interchangeable guide cards adapted to be supported in the groove, indicia on the guide cards adapted to be displayed by an exposed face of the foremost guide card in the groove and viewed by an observer in front of the base, a plurality of blocks each bearing indicia on at least one face, and projecting from each block in a direction parallel with the face carrying the indicia a pair of spaced pins adapted to be entered in a pair of openings in the base whereby by proper selection and positioning of the blocks on the base, the indicia appearing on the foremost guide card may be repeated.

2. An educational device comprising a transparent plastic base having a longitudinal row of openings in its upper face near its forward edge, said openings being arranged in longitudinally spaced pairs, said base also having a longitudinal groove in its upper face lying parallel with the row of openings near the rear edge of the base, a group of interchangeable guide cards adapted to be supported in the groove, indicia on the guide cards adapted to be displayed by an exposed face of the foremost guide card in the groove and viewed by an observer in front of the base, a plurality of blocks each bearing indicia on at least one face, and projecting from each block in a direction parallel with the face carrying the indicia a pair of spaced pins adapted to be entered in a pair of openings in the base whereby by proper selection and positioning of the blocks on the base, the indicia appearing on the foremost guide card may be repeated and means housed within the base to illuminate the exposed face of the foremost guide card.

3. An educational device comprising a transparent plastic base having a longitudinal row of openings in its upper face near its forward edge, said openings being arranged in longitudinally spaced pairs, said base also having a longitudinal groove in its upper face lying parallel with the row of openings near the rear edge of the base, a group of interchangeable guide cards adapted to be supported in the groove, indicia on the guide cards adapted to be displayed by an exposed face of the foremost guide card in the groove and viewed by an observer in front of the base, a plurality of blocks each bearing self-illuminated indicia on at least one face, and projecting from each block in a direction parallel with the face carrying the indicia a pair of spaced pins adapted to be entered in a pair of openings in the base whereby by proper selection and positioning of the blocks on the base, the indicia appearing on the foremost guide card may be repeated.

4. An educational device comprising a transparent plastic base having a longitudinal row of openings in its upper face near its forward edge, said openings being arranged in longitudinally spaced pairs, said base also having a longitudinal groove in its upper face lying parallel with the row of openings near the rear edge of the base, a group of interchangeable guide cards adapted to be supported in the groove, indicia on the guide cards adapted to be displayed by an exposed face of the foremost guide card in the groove and viewed by an observer in front of the base, a plurality of blocks each bearing self-illuminated indicia on at least one face, and projecting from each block in a direction parallel with the face carrying the indicia a pair of spaced pins adapted to be entered in a pair of openings in the base whereby by proper selection and positioning of the blocks on the base, the indicia appearing on the foremost guide card may be repeated and means housed within the base to illuminate the exposed face of the foremost guide card.

ALLEN S. HOFFMAN.

REFERENCES CITED

The following references are of record in the file of this patent:

UNITED STATES PATENTS

| Number | Name | Date |
| --- | --- | --- |
| 1,627,528 | Vincent | May 3, 1927 |
| 1,642,644 | Clemons | Sept. 13, 1927 |
| 1,844,097 | Luhman | Feb. 9, 1932 |
| 2,177,641 | Evans | Oct. 31, 1939 |
| 2,135,859 | Swanson | Nov. 8, 1938 |
| 1,760,767 | Muller | May 27, 1930 |
| 193,464 | Shepherd | July 24, 1877 |
| 198,552 | Shepherd | Dec. 25, 1877 |
| 364,845 | Oakly | June 14, 1887 |
| 371,338 | Matson | Oct. 11, 1887 |

FOREIGN PATENTS

| Number | Country | Date |
| --- | --- | --- |
| 344,668 | Great Britain | 1931 |

OTHER REFERENCES

Garrison-Wagner Co., St. Louis, U. S. A., page 32. (Received in Div. 35 before 1942. In class 40–130.2 photostat copy.)